(12) United States Patent
Frock et al.

(10) Patent No.: US 8,080,766 B2
(45) Date of Patent: Dec. 20, 2011

(54) STEAM OVEN SYSTEM WITH STEAM GENERATOR

(75) Inventors: Jeffrey L. Frock, Troy, OH (US); Nathan Engelbert, Dayton, OH (US); Gary Morey, Tipp City, OH (US)

(73) Assignee: Premark FEG L.L.C., Wilmington, DE (US)

( * ) Notice: Subject to any disclaimer, the term of this patent is extended or adjusted under 35 U.S.C. 154(b) by 1089 days.

(21) Appl. No.: 11/924,930

(22) Filed: Oct. 26, 2007

(65) Prior Publication Data
US 2009/0107477 A1 Apr. 30, 2009

(51) Int. Cl.
*A21B 1/36* (2006.01)
*A21B 3/04* (2006.01)

(52) U.S. Cl. ........ 219/401; 219/394; 219/486; 126/20.2

(58) Field of Classification Search .................. None
See application file for complete search history.

(56) References Cited

U.S. PATENT DOCUMENTS

| | | | | |
|---|---|---|---|---|
| 884,288 | A * | 4/1908 | Nash | 34/526 |
| 1,430,532 | A * | 10/1922 | Brown | 126/20.2 |
| 1,814,122 | A * | 7/1931 | Bryson | 126/20.2 |
| 2,214,425 | A * | 9/1940 | McNamara | 126/20.2 |
| 2,237,519 | A * | 4/1941 | Bolling | 126/20.2 |
| 5,951,901 | A * | 9/1999 | Douglas et al. | 219/519 |
| 5,988,154 | A * | 11/1999 | Douglas et al. | 126/20.1 |
| 6,000,392 | A * | 12/1999 | Stritzl et al. | 126/369.2 |
| 7,487,714 | B2 * | 2/2009 | Andoh et al. | 99/330 |
| 7,759,615 | B2 * | 7/2010 | Ando et al. | 219/401 |
| 2006/0225726 | A1 * | 10/2006 | Andoh et al. | 126/20 |
| 2007/0138160 | A1 * | 6/2007 | Ando et al. | 219/401 |
| 2007/0175885 | A1 * | 8/2007 | Brower et al. | 219/401 |
| 2007/0210058 | A1 * | 9/2007 | Ando et al. | 219/401 |
| 2009/0071346 | A1 * | 3/2009 | Saksena et al. | 99/330 |
| 2009/0107477 | A1 * | 4/2009 | Frock et al. | 126/20.2 |
| 2010/0095944 | A1 * | 4/2010 | Frock et al. | 126/20.1 |

OTHER PUBLICATIONS

B-Tronic Geschirrspülautomaten mit Bandtransport, dated Oct. 1996; 28 pagaes.
B-Tronic Ersatzteilliste dated 2009; 5 pages.

* cited by examiner

Primary Examiner — Joseph M Pelham
(74) Attorney, Agent, or Firm — Thompson Hine LLP

(57) ABSTRACT

A steam cooker includes one or more cooking chamber having an access door. A steam generator unit is provided for heating water to generate steam. The steam generator unit may be connected for selective delivery of steam to one or more multiple cooking chambers. In some embodiments, a steam superheater is provided with a superheating chamber and a delime operation is used to delime the superheater chamber. In some embodiments, the steam generator includes an air flow passageway with a valve that controls passage of air through the air flow passageway into and out of the steam generator during steam generator drain and/or fill operations.

8 Claims, 2 Drawing Sheets

STEAM OVEN SYSTEM WITH STEAM GENERATOR

TECHNICAL FIELD

The present application relates generally to steam oven systems used to steam food products, and more particularly to a steam oven system and steam generator.

BACKGROUND

Steam cookers have been successfully employed by restaurants, hospitals and other food service operations to prepare quickly and conveniently large quantities of food. Many such cookers are used in high volume situations. It is desirable to provide steam cooking systems with reduced maintenance requirements, improved efficiency, etc.

SUMMARY

In an aspect, a steam cooker includes a first steam cooking chamber having an access door and a second steam cooking chamber having an access door. A steam generator unit is provided for heating water to generate steam. The steam generator unit is connected for selective delivery of steam to the first steam cooking chamber alone, the second steam cooking chamber alone or both the first steam cooking chamber and the second steam cooking chamber. The steam generator includes at least first and second energizable heating elements for heating water, and an associated controller that operates to (i) energize both the first and second heating elements when initially heating water to bring the steam generator up to a set operating condition, (ii) energize one, but not the other, of the first heating element or the second heating element, when only the first steam cooking chamber requires steam for cooking and (iii) energize both the first heating element and the second heating element when both the first steam cooking chamber and the second steam cooking chamber require steam for cooking.

In another aspect, a steam cooker includes a steam cooking chamber having an access door. A steam generator unit heats water to generate steam. The steam generator unit is connected for delivery of steam from the steam generator to the steam cooking chamber via a steam path, the steam generator having an operating water level. A steam superheater is positioned along the steam path for superheating steam. The steam superheater includes a superheating chamber. A flow path enables liquid to flow between the steam generator and the superheating chamber. A flow control device is positioned along the flow path for selectively permitting liquid flow along the flow path. A controller is connected for controlling the flow control device. The controller operates the flow control device to provide liquid flow from the steam generator to the superheating chamber during a delime operation of the steam generator such that the superheater chamber is also delimed In another aspect, a steam cooker includes a steam cooking chamber including an access door. A steam generator unit heats water to generate steam. The steam generator unit includes a tank that receives water from a water source. The tank is connected to the steam cooking chamber for delivery of steam from the steam generator to the steam cooking chamber for a cooking operation via a steam path. An air flow passageway allows air to enter the tank from the atmosphere and exit the tank to the atmosphere. A valve controls passage of air through the air flow passageway into and out of the tank. A controller is used to control operation of the valve. During a steam generator drain operation, the controller operates to place the valve in an open configuration to allow air to enter the tank through the air flow passageway so as to limit creation of a vacuum effect within the steam generator.

The details of one or more embodiments are set forth in the accompanying drawings and the description below. Other features, objects, and advantages will be apparent from the description and drawings, and from the claims.

DETAILED DESCRIPTION

Figure 1:
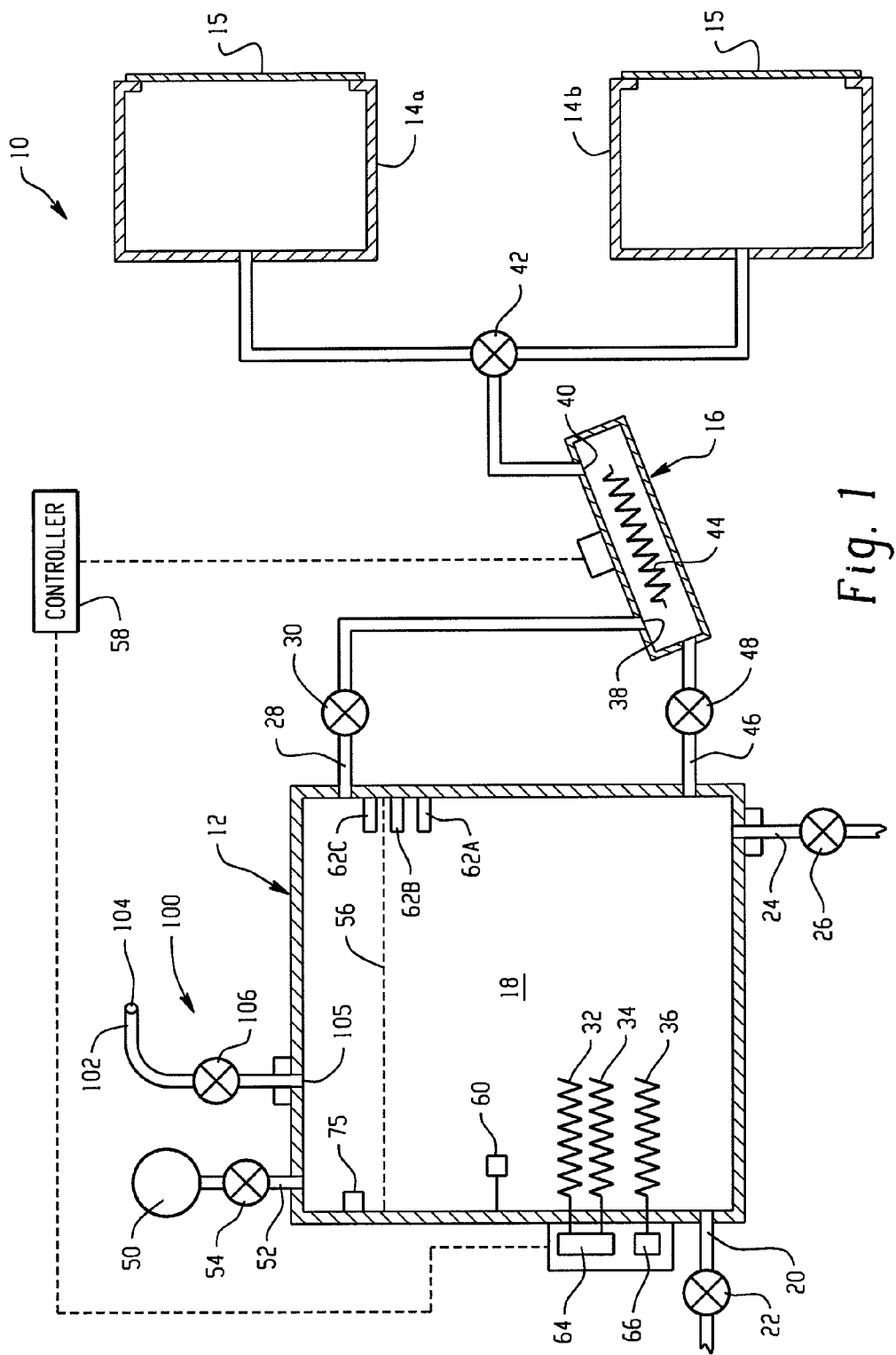
FIG. 1 is a diagrammatic illustration of an embodiment of a steam cooking system.

Referring to FIG. 1, a steam cooking system 10 includes a steam generator 12 for generating steam and cooking chambers 14a and 14b that are used for cooking food placed therein. The cooking chambers 14 may be formed by an insulated housing and include an access opening with a door 15 movable between open and closed conditions. The steam generator 12 includes a heating chamber 18 where steam is generated, a water inlet 20 and associated valve 22 through which water enters the heating chamber, a drain 24 and associated valve 26 through which liquid exits the heating chamber, and a steam outlet 28 and associated valve 30 through which steam exits the heating chamber. Heating elements 32, 34 and 36 are shown schematically within the heating chamber 18. The heating elements 32, 34 and 36 are of an electrical type and are used to heat the water within the heating chamber 18 so as to generate the steam.

A steam superheater 16 is provided that superheats steam delivered from the heating chamber 18 (e.g., to a temperature of between about 220 and 260 degrees F., such as about 240 degrees F.). The steam superheater 16 includes a steam inlet 38 through which steam enters the steam superheater from the heating chamber 18 and a steam outlet 40 and associated valve 42 through which superheated steam exits the steam superheater on its way to one or both of the cooking chambers 14. Heating element 44 is shown schematically within the steam superheater 16, which may of an electrical type and is in a heat exchange relationship with the steam flowing through the steam superheater. While one heating element 44 is shown, multiple heating elements 44 may be used. A fluid flow path 46 and associated valve 48 is provided between the steam generator 12 and the steam superheater 16 at a level below the operating water level of the steam generator. As will be described in greater detail, the fluid flow path 46 and associated valve 48 allow for fluid communication between the steam generator 12 and the steam superheater 16 during a cleaning and draining operation.

During use, the heating chamber 18 of the steam generator 12 is initially filled with water with the valve 48 closed. As can be seen, the steam superheater 16 is located vertically below the water line 56 (represented by the broken line) in the heating chamber 18. For a cooking operation, the water is heated using the heating elements 32, 34 and 36 (this will be described in greater detail below) and steam is generated and delivered to the steam superheater 16. As indicated above, the steam superheater 16 superheats the steam using heating element 44 and the superheated steam is delivered to one or both of the cooking chambers 14. Valve 48 is maintained in a closed condition during such steam cooking operations.

In some instances, such as after the cooking operation, the steam cooking system 10 may be cleaned. Such a cleaning operation may involve cleaning scale and other build-up from the steam generator 12 and the steam superheater 16.

Referring still to FIG. 1, a delime agent source 50 is connected to the heating chamber 18 via inlet 52 and associated valve 54. In some embodiments, the delime agent source 50 is connected to the water inlet 20. In other arrangements, an opening (e.g., with removable cap) could be provided to facilitate manual introduction of the delime agent into the heating chamber 18. During a cleaning and draining operation, delime agent is introduced to the water in the heating chamber 18. The valve 48 of the fluid flow path 46 is opened after introducing the delime agent to the water in the heating chamber 18. Because the steam superheater 16 is positioned below the water line 56, the water/delime agent combination is introduced from the heating chamber 18, through the fluid flow path 46 and into the steam superheater, which is used to clean the elements within the steam superheater.

After introducing the water/delime agent combination from the heating chamber 18 into the steam superheater 16 for a desired delime time period, the drain valve 26 opens and the water/delime agent combination within the heating chamber is drained therethrough along with any debris. The steam superheater 16 is also drained of the water/delime agent combination as the water/delime agent combination is drained from the heating chamber 18. As represented by FIG. 1, the steam superheater 16 is tilted vertically such that one end of the steam superheater is elevated with respect to an opposite end of the steam superheater, thereby facilitating draining of the water/delime agent combination therefrom. The fluid path 46 may be similarly tilted. While the steam superheater 16 is illustrated as being tilted, other configurations are contemplated such as an inclined bottom surface, slanting downwardly toward the fluid path 46. The valves 48 and 26 are then closed once the water/delime agent combination is drained from the heating chamber 18 and the steam superheater 16, and the heating chamber 18 may be again filled. In some embodiments, a clean water flushing operation of both the heating chamber 18 and the steam superheater 16 may also be employed after draining the water/delime agent combination.

In some embodiments, a controller 58 controls opening and closing of the various valves and may also be connected to a user input. The controller 58 may initiate the cleaning and draining operation automatically (e.g., after a certain time period of operation), at a pre-selected time, upon receiving a user input, etc.

In the embodiment of FIG. 1, the steam generator includes three heating elements 32, 34 and 36, which can be used to heat the water in the heating chamber 18. A pressure sensor 60 is also provided for monitoring pressure within the heating chamber 18 and water level sensors 62 are provided for monitoring water levels within the heating chamber. The controller 58 may be connected to the pressure and water level sensors 60, 62 for receiving information therefrom.

In some embodiments, the steam cooking system 10 controls operation (e.g., using controller 58) of the heating elements 32, 34 and 36 based on certain operating conditions of the steam cooking system. Regulating contactors, represented schematically by elements 64 and 66, are used by the controller 58 to control the heating elements 32, 34 and 36. In one embodiment, contactor 64 controls heating elements 32 and 34, while contactor 66 controls heating element 36 based on a control signal from the controller 58.

Figure 2:
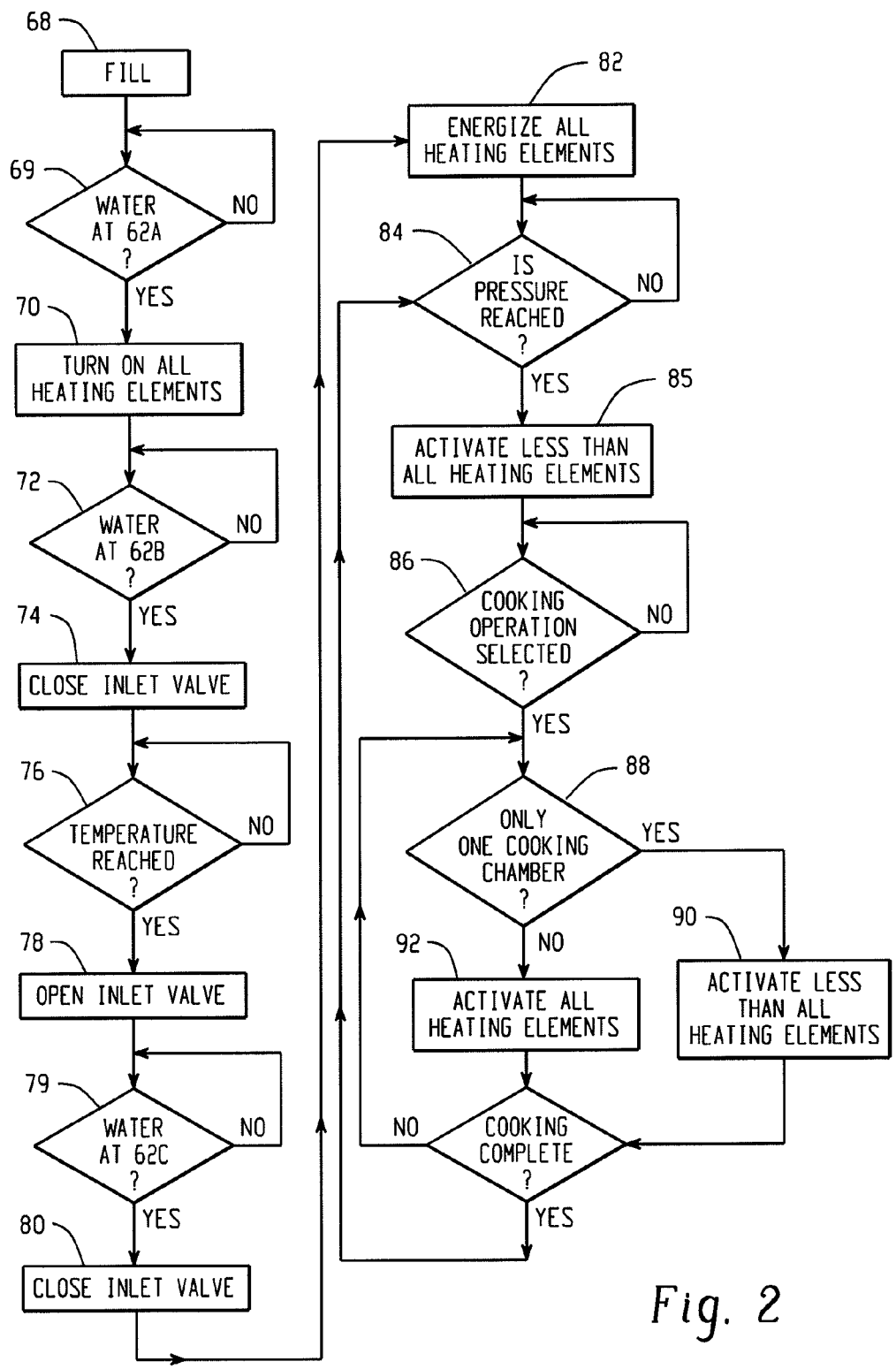
FIG. 2 is an embodiment of a method of operating the steam cooking system of FIG. 1.

Referring now to FIG. 2, the heating chamber 18 is initially filled through the water inlet 20 by opening valve 22 at step 68. Once the water level inside the heating chamber 18 reaches a predetermined level as sensed by water level sensor 62A (which provides a signal to the controller 58) at step 69, all the heating elements 32, 34 and 36 are activated at step 70. At step 72, the controller looks whether the water level reaches water level sensor 62B. Once the water level reaches a predetermined level as sensed by water level sensor 62B (which provides a signal to the controller 58), the inlet valve 22 is closed thereby preventing water from (or reducing the flow rate of water) entering the heating chamber 18 at step 74. At step 76, it is determined whether a predetermined water temperature is reached within the heating chamber 18 using temperature sensor 75. If the predetermined water temperature has been reached, the inlet valve 22 is reopened at step 78 until the water level reaches water level sensor 62C. If the predetermined water temperature has not been reached, the inlet valve 22 remains closed until the predetermined water temperature is reached. Once the water level reaches water level 62C as determined at step 79, the inlet valve 22 is again closed at step 80 and all the heating elements 32, 34 and 36 remain energized at step 82 until a predetermined pressure is reached as sensed by pressure sensor 60. Once the pressure within the heating chamber 18 reaches a predetermined pressure as determined at step 84 using pressure sensor 60 (which provides a signal to controller 58), contactor 66 is deactivated by the controller 58 and only contactor 64 is used to regulate the pressure within the heating chamber by turning only heating elements 32 and 34 on and off at step 85 depending on whether the detected pressure within the heating chamber is within or out of a predetermined pressure range. Only less than all heating elements are used to regulate the pressure until a cooking operation is selected (i.e., as long as the steam cooking system 10 is idle). If a cooking operation is selected using only a single cooking chamber 14a or 14b, then only contactor 64 is still used at step 90 to regulate the pressure within the heating chamber 18 using only heating elements 32 and 34.

If a cooking operation is selected using both cooking chambers 14a and 14b as determined at step 88, then at step 92 both contactors 64 and 66 are used to regulate the pressure within the heating chamber by turning all the heating elements 32, 34 and 36 on and off depending on whether the detected pressure within the heating chamber 18 is within or out of a predetermined pressure range. Thus, the steam cooking system 10 can manage how many heating elements 32, 34 and 36 are used based on whether the water is being heated initially (e.g., upon startup) and on how many cooking chambers 14 are being used during a cooking operation. This management can reduce the number of contactor cycles and the current draw when idling or when operating a single cooking chamber.

Alternatives are contemplated. For example, each contactor 64 and 66 may operate two or more heating elements, or multiple contactors may each operate only one heating element.

Referring back to FIG. 1, in some embodiments, the steam generator 12 includes a venting system, generally referred to as element 100, that allows air to evacuate the heating chamber 18 during a filling operation and that allows air to enter the heating chamber during a draining operation. The venting system 100 includes a vent conduit 102 including an end 104 in communication with the environment and an opposite end 105 in communication with the heating chamber 18. A vent valve 106 controls air flow through the vent conduit 102. A controller 58 may be used to control opening and closing of vent valve 106.

In some embodiments, the vent valve 106 is normally open. As the heating chamber 18 fills with water and is heated, for example, as described above with reference to FIG. 2, air escapes through the vent conduit 102 to the environment. Once the water level reaches water level sensor 62A, the vent valve 106 is closed to prevent air from escaping the heating chamber along conduit 102. The steam generator 12 then pressurizes to the operating pressure.

During a draining operation, for example, as described above with reference to FIG. 1 with the drain valve 26 open and the water draining through the drain 24, the vent valve 106 is opened when the water level drops below the water level sensor 62A thereby allowing air to enter the heating chamber through the vent conduit 102. Allowing air to enter the heating chamber 18 prevents or limits a vacuum effect within the heating chamber 18, which vacuum effect could reduce the drain rate of the water therefrom. This venting operation may be particularly advantageous in draining operations where a high pressure water jet is directed directly into the drain 24, for example, to remove build-up therefrom.

While sensor 62A (the lowest water level sensor) is described as being used to control the opening and closing of the vent valve 106, in some embodiments, valve 62B or 62C may be used. In some embodiments, combinations of the valves 62A, 62B and/or 62C may be used. For example, one of the valves 62 may be used during the fill operation to detect when the water level reaches a predetermined water level and another of the valves 62 may be used during the drain operation to determine when the water level falls below a different predetermined water level.

It is to be clearly understood that the above description is intended by way of illustration and example only and is not intended to be taken by way of limitation. For example, as an alternative embodiment, referring to FIG. 1, the steam superheater 16 may be located above the operating water level 56 and a flow control device such as a pump may be used to pump the water/delime combination into the steam superheater. Accordingly, other changes and modifications could be made.

What is claimed is:

1. A steam cooker, comprising:
a first steam cooking chamber having an access door;
a second steam cooking chamber having an access door;
a steam generator unit for heating water to generate steam, the steam generator unit connected for selective delivery of steam to the first steam cooking chamber alone, the second steam cooking chamber alone or both the first steam cooking chamber and the second steam cooking chamber, the steam generator including at least first and second energizable heating elements for heating water, and an associated controller that operates to:
  (i) energize both the first and second heating elements when initially heating water to bring the steam generator up to a set operating condition;
  (ii) energize one, but not the other, of the first heating element or the second heating element, when only the first steam cooking chamber requires steam for cooking; and
  (iii) energize both the first heating element and the second heating element when both the first steam cooking chamber and the second steam cooking chamber require steam for cooking.

2. The steam cooker of claim 1 wherein the controller further operates to:
  (iv) energize one, but not the other, of the first heating element or the second heating element in order to maintain the set operating condition when neither the first steam cooking chamber nor the second steam cooking chamber requires steam for cooking.

3. The steam cooker of claim 2 wherein the steam generator includes a third energizable heating element and the controller operates to:
  (v) also energize the third heating element when initially heating water to bring the steam generator up to a set operating condition;
  (vi) energize the third heating element when only the first steam cooking chamber requires steam for cooking;
  (vii) energize the third heating element when both the first steam cooking chamber and the second steam cooking chamber require steam for cooking; and
  (viii) energize the third heating element in order to maintain the set operating condition when neither the first steam cooking chamber nor the second steam cooking chamber requires steam for cooking.

4. The steam cooker of claim 3 wherein the controller controls energization of the first heating element and the third heating element via a first switching device, and the controller controls energization of the second heating via a second switching device.

5. The steam cooker of claim 4 wherein the first switching device is a contactor and the second switching device is a contactor.

6. A method of operating a steam cooker system that includes a first steam cooking chamber having an access door, a second steam cooking chamber having an access door, and a steam generator unit for heating water to generate steam, the steam generator unit connected for selective delivery of steam to the first steam cooking chamber alone, the second steam cooking chamber alone or both the first steam cooking chamber and the second steam cooking chamber, the steam generator including at least first and second energizable heating elements for heating water, and a controller for effecting controlled energization of the heating elements, the method comprising:
  (i) energizing both the first and second heating elements when initially heating water to bring the steam generator up to a set operating condition;
  (ii) energizing one, but not the other, of the first heating element or the second heating element, when only the first steam cooking chamber requires steam for cooking; and
  (iii) energizing both the first heating element and the second heating element when both the first steam cooking chamber and the second steam cooking chamber require steam for cooking.

7. The method of claim 6, further including:
  (iv) energizing one, but not the other, of the first heating element or the second heating element in order to maintain the set operating condition when neither the first steam cooking chamber nor the second steam cooking chamber requires steam for cooking.

8. The method of claim 7 wherein the steam generator includes a third energizable heating element and the method includes:
  (v) also energizing the third heating element when initially heating water to bring the steam generator up to a set operating condition;
  (vi) energizing the third heating element when only the first steam cooking chamber requires steam for cooking;
  (vii) energizing the third heating element when both the first steam cooking chamber and the second steam cooking chamber require steam for cooking; and
  (viii) energizing the third heating element in order to maintain the set operating condition when neither the first steam cooking chamber nor the second steam cooking chamber requires steam for cooking.

* * * * *